March 29, 1960     S. T. SHEARS     2,930,094
PANTS FASTENER
Filed Oct. 31, 1957
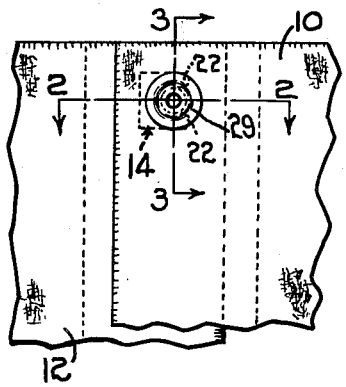
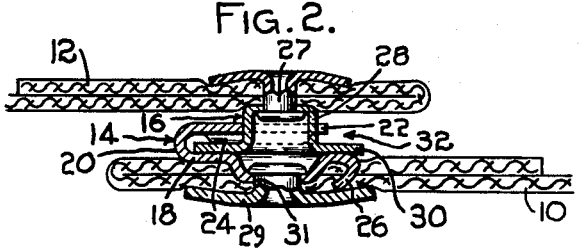
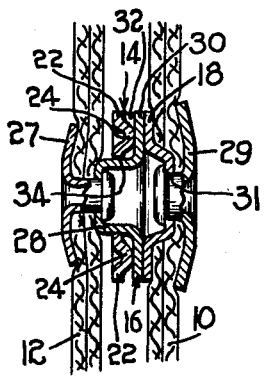
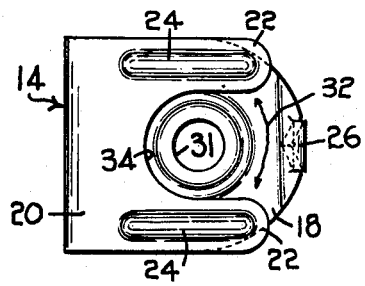
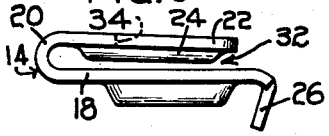
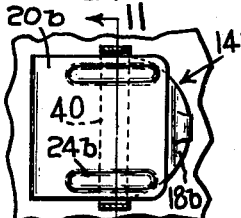
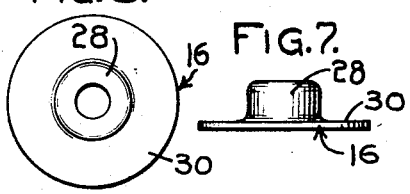
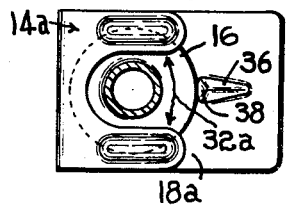
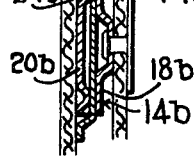
INVENTOR:
STUART T. SHEARS,
BY *Walter S. Jones*
ATTORNEY

United States Patent Office 2,930,094
Patented Mar. 29, 1960

2,930,094

PANTS FASTENER

Stuart T. Shears, Belmont, Mass., assignor to United-Carr Fastener Corporation, Cambridge, Mass., a corporation of Delaware Application October 31, 1957, Serial No. 693,655

2 Claims. (Cl. 24—222)

This invention relates generally to fastening devices, and has particular reference to a fastener for use in securing together overlapping segments of sheet material.

The object of the invention is to provide a separable fastener assembly having a retainer hook means and a stud means to be frictionally engaged to prevent accidental disengagement.

A still further object of the invention is to provide a separable fastener assembly having a retainer hook means and a stud means, the retainer hook means having members which prevent damaging conpression of the hook means on application of external pressures.

Other objects of the invention will, in part, be obvious, and will, in part, appear hereinafter.

In the drawing:

Fig. 1 is a view of a portion of an assembly embodying the features of the invention;

Fig. 2 is an enlarged view in section taken on line 2—2 of Fig. 1;

Fig. 3 is an enlarged view in section taken on line 3—3 of Fig. 1;

Fig. 4 is an enlarged plan view of the retainer hook member of the fastener used in the assembly illustrated by Fig. 1;

Fig. 5 is an edge elevation of the hook member shown by Fig. 4;

Fig. 6 is an enlarged plan view of the stud used with the hook;

Fig. 7 is an elevational view of the stud shown by Fig. 6;

Fig. 8 is an enlarged sectional plan view of a modified form of the hook member assembled with the stud;

Fig. 9 is an edge view partly in section of the parts shown by Fig. 8;

Fig. 10 is an enlarged plan view partly in section of the modified form of the fastening device;

Fig. 11 is a section taken on the line 11—11 of Fig. 10.

Referring to the drawing, there is illustrated a separable fastener assembly for attachment to a supporting sheet or sheets.

The assembly comprises a retainer hook means 14 and a flanged stud 16. The retainer hook comprises generally a base 18, a hook member 20, arms 22, embossed ribs or similar protuberances 24 located on the arms as shown and a prong 26 for contact with one of the supporting sheets.

The retainer hook 14 may be attached to its supporting sheet 10, in any suitable manner. However, I have shown this part attached by means of a hook eyelet 29 which is passed through the sheet 10 and then through an aperture 31 in the base 18 with its end against the base. It will be noted I have provided a prong like element 26 at the engaging edge of the base 18 which, during the time the hook eyelet 29 is engaging the base, pierces the supporting sheet 10 and engages the flange of the eyelet 29 and is curled against the supporting sheet 10. The stud 16 comprises a body 28, a flange 30 and an attaching means 27 for attaching it to the supporting sheet 12.

To engage the stud 16 with the retainer hook 14, the flange 30 is passed through the lateral opening 32 into the space between the arms 22 and the base 18 engaging the embossed ribs 24 and the base 18. In the preferred embodiment of the invention, the arms 22 are bifurcated and the body 28 of the stud passes through the lateral opening 32 into the horizontal opening 34 formed by the bifurcation of the arms 22 as shown in Fig. 4.

Referring now to Figs. 8 and 9, there is illustrated a modified form of retainer hook 14a embodying the features of the invention and embodying an embossment 36 extending upward from the base 18a in front of the lateral opening 32a. The embossment has a surface 38 which is inclined against the base 18 and faces the lateral opening 32a which on engagement of the retainer hook 14a and the flanged stud 16a will supply additional means of preventing disengagement of the parts. The retainer hook 14a except for the dimensions of the base 18a is otherwise similar to the retainer hook 14 and engages a stud 16a which is similar to the stud 16.

Referring now to Figs. 10 and 11, there is illustrated a further modification of the retainer hook 14 numbered 14b embodying the features of the invention and comprising a hook member 20b without the bifurcated arms 22 shown in Fig. 4. The hook member 20b has at least one embossed rib 24b integral with the hook member 20b and extending into the space between the base member 18b and the hook member 20b. An advantage of this modified retainer hook 14b is that it can be engaged with an appropriate means such as the bar 40 shown in Fig. 10.

Since certain other obvious modifications may be made in the invention without departing from its scope, it is intended that all matters contained herein be interpreted in an illustrative and not in a limiting sense.

I claim:

1. Fastener retaining hook means for a supporting member comprising a base, a hook member in spaced, superposed relationship to said base and integrally united at one end to one end of said base by a connecting portion, said hook member being bifurcated and presenting laterally immovable arms extending along each side edge of the hook member in parallel, opposed relationship to one another forming a lateral opening therebetween extending from the end of said hook member opposite the jointure of said hook member to said base and adapted to receive a flanged stud therein, each of said arms having a rib extending therefrom in the direction of said base and forming a space therebetween adapted to receive the flange of a flanged stud therein, the free end of said base being bent away from said opening and a prong on the bent free end of said base extending in a direction away from said hook member and reversely bendable for engagement with the supporting member to prevent rotation of the hook means and to provide a lead-in for the flanged stud.

2. A fastener device for securing together inner and outer overlapping segments of sheet material in detachable relationship, said fastener device including hook means adapted to be secured to the outer face of the inner segment of sheet material and a flanged stud attaching means adapted to be secured to the inner face of the outer segment of sheet material in juxtaposed cooperating fastening engagement with said hook means; said hook means comprising a base, a hook member in spaced superposed relationship to said base and integrally united at one end to one end of said base by a connecting portion, said hook member being bifurcated and presenting laterally immovable arms extending along each side edge of the hook member in parallel opposed relationship to one another forming a lateral opening therebetween extending from the end of said hook member opposite the jointure of said hook member to said base within which the stud of said flanged stud is positionable, each of said arms having a rib extending therefrom in the direction of said base and forming a space therebetween for receiving the flange portion of said flanged stud, the free end of said base being bent away from said opening and a prong on the free end of the base extending in a direction away from the hook member and reversely bendable for engagement with the segment of the inner sheet to prevent rotation of the hook means and to provide a lead-in for the cooperating flanged stud.

References Cited in the file of this patent

UNITED STATES PATENTS

| | | |
|---|---|---|
| 531,442 | Mason et al. | Dec. 25, 1894 |
| 1,404,471 | Nilsson | Jan. 24, 1922 |
| 1,519,380 | Kochanski | Dec. 16, 1924 |
| 2,703,915 | Markin | Mar. 15, 1955 |

FOREIGN PATENTS

| | | |
|---|---|---|
| 17,283 | Great Britain | Aug. 6, 1902 |
| 919,582 | Germany | Oct. 28, 1954 |